United States Patent
Medina Cruz et al.

(10) Patent No.: US 10,393,145 B2
(45) Date of Patent: Aug. 27, 2019

(54) ASYMMETRIC ALIGNMENT SYSTEM FOR A VARIABLE STATOR VANE

(71) Applicant: General Electric Company, Schenectady, NY (US)

(72) Inventors: Martin Medina Cruz, Queretaro (MX); Raul Ricardo Sanchez, Queretaro (MX)

(73) Assignee: General Electric Company, Schenectady, NY (US)

( * ) Notice: Subject to any disclaimer, the term of this patent is extended or adjusted under 35 U.S.C. 154(b) by 658 days.

(21) Appl. No.: 15/058,817

(22) Filed: Mar. 2, 2016

(65) Prior Publication Data

US 2017/0254342 A1    Sep. 7, 2017

(51) Int. Cl.
*F04D 29/56* (2006.01)
*F01D 17/16* (2006.01)
*F16B 35/04* (2006.01)

(52) U.S. Cl.
CPC ......... *F04D 29/563* (2013.01); *F01D 17/162* (2013.01); *F16B 35/042* (2013.01)

(58) Field of Classification Search
CPC ..... F01D 17/162; F16B 35/041; F16B 35/042
See application file for complete search history.

(56) References Cited

U.S. PATENT DOCUMENTS

| | | | |
|---|---|---|---|
| 3,036,487 A * | 5/1962 | Hughes | F16B 5/06 411/352 |
| 3,459,250 A | 8/1969 | Tabor | |
| 5,492,446 A * | 2/1996 | Hawkins | F01D 17/162 411/116 |
| 5,636,968 A | 6/1997 | Audet et al. | |
| 6,019,574 A | 2/2000 | Dibella | |
| 6,688,846 B2 | 2/2004 | Caubet et al. | |
| 7,198,461 B2 * | 4/2007 | Burgmeier | F01D 17/162 415/160 |
| 7,530,784 B2 | 5/2009 | Maurice et al. | |
| 8,215,902 B2 | 7/2012 | Major et al. | |
| 8,668,444 B2 | 3/2014 | Jarrett, Jr. et al. | |
| 9,551,234 B2 * | 1/2017 | Colette | F01D 17/162 |

(Continued)

FOREIGN PATENT DOCUMENTS

| | | |
|---|---|---|
| EP | 1088171 B1 | 2/2009 |
| WO | 0009863 A1 | 2/2000 |

*Primary Examiner* — Jason D Shanske
*Assistant Examiner* — John S Hunter, Jr.
(74) *Attorney, Agent, or Firm* — Dority & Manning, P.A.

(57) ABSTRACT

A variable stator vane includes an airfoil having a first end, a second end, and a longitudinal axis connecting the first end with the second end. The variable stator vane further includes a first trunnion disposed along the longitudinal axis at the airfoil first end. The first trunnion includes a trunnion seat extending integrally from a distal end of the trunnion opposite the airfoil. The trunnion seat includes first and second parallel seating flats opposing each other about the longitudinal axis. The variable stator vane further includes a threaded stem extending integrally from the trunnion seat and coaxial with the trunnion about the longitudinal axis. The threaded stem includes a flat first alignment surface coextensive with the first parallel seating flat in the longitudinal direction, and an arcuate second alignment surface aligning with the second parallel seating flat in the longitudinal direction.

20 Claims, 4 Drawing Sheets

(56) References Cited

U.S. PATENT DOCUMENTS

2012/0251297 A1 10/2012 Major et al.
2013/0129487 A1* 5/2013 Colette ................ F01D 17/162
　　　　　　　　　　　　　　　　　　　　　　　　415/148

* cited by examiner

ASYMMETRIC ALIGNMENT SYSTEM FOR A VARIABLE STATOR VANE

BACKGROUND

The field of the disclosure relates generally to gas turbine engines and, more particularly, to compressor variable stator vanes therein.

A typical gas turbine engine compressor includes several rows or stages of compressor stator vanes and corresponding rows or stages of compressor rotor blades therebetween. During operation, air is sequentially compressed in the compressor stages and channeled to a combustor to be mixed with fuel and ignited for generating hot combustion gases which power the engine. Compressor performance is improved by providing variable stator vanes which are selectively rotated about their longitudinal or radial axes. This rotation is accomplished by attaching a corresponding lever arm to the radially outer ends of the vanes and joining the several levers to a common actuation or unison ring for providing uniform adjustment of the individual vanes to maximize compressor performance. Each of the variable vanes is identically angled relative to the other vanes in the row to maximize efficiency and prevent undesirable aerodynamic distortion from a misaligned stator vane.

To ensure proper alignment of the individual stator vanes, each vane typically includes a generally D-shaped seat around which a complementary D-shaped mounting hole of the lever is positioned. A threaded stem extends from the seat and receives a nut which secures the individual levers to the corresponding vanes. Although the corresponding D-shapes of the trunnion seat and lever arm mounting hole are provided for eliminating misalignment therebetween, the assembly process for obtaining the interference fit therebetween may nevertheless result in a misalignment when the interference fit is formed. A portion of the threaded stem protrudes through the D-shaped mounting hole before D-shaped mounting hole is positioned on the D-shaped seat. Tightening the retention nut on this protruding portion of the threaded stem, without first confirming that the lever is oriented correctly, can produce misalignment between the lever arm and its respective vane.

At least some known systems avoid this misalignment error by using retention nuts of sufficient length to include only a partial threading away from the lever arm such that the threaded stem cannot engage the corresponding threading on the retention nut until the lever arm is seated on the trunnion seat. This solution, however, requires an undesirable additional length to the threaded stem, and cannot be easily utilized with more compact engine designs.

BRIEF DESCRIPTION

In one aspect, a variable stator vane includes an airfoil having a first end, a second end, and a longitudinal axis connecting the first end with the second end. The variable stator vane further includes a first trunnion disposed along the longitudinal axis at the airfoil first end. The first trunnion includes a trunnion seat extending integrally from a distal end of the trunnion opposite the airfoil. The trunnion seat includes first and second parallel seating flats opposing each other about the longitudinal axis. The variable stator vane further includes a threaded stem extending integrally from the trunnion seat and coaxial with the trunnion about the longitudinal axis. The threaded stem includes a flat first alignment surface coextensive with the first parallel seating flat in the longitudinal direction, and an arcuate second alignment surface aligning with the second parallel seating flat in the longitudinal direction.

In another aspect, a variable stator vane assembly includes an airfoil having a first end, a second end, and a longitudinal axis connecting the first end with the second end. The variable stator vane assembly further includes a first trunnion disposed along the longitudinal axis at the airfoil first end. The first trunnion includes a trunnion seat extending integrally from a distal end of the trunnion opposite the airfoil. The trunnion seat includes first and second parallel seating flats opposing each other about the longitudinal axis. The variable stator vane assembly further includes a threaded stem extending integrally from the trunnion seat and coaxial with the trunnion about the longitudinal axis. The variable stator vane assembly further includes a flat first alignment surface coextensive with the first parallel seating flat in the longitudinal direction, and an arcuate second alignment surface aligning with the second parallel seating flat in the longitudinal direction. The variable stator vane assembly further includes a lever arm having a mounting hole at a proximal end thereof, and a retention nut configured to secure the lever arm about the trunnion seat when engaged with the threaded stem. The mounting hole is configured for complementary engagement with the trunnion seat.

In yet another aspect, a compressor for a gas turbine engine includes an inner casing and an outer casing surrounding the inner casing. The outer casing includes an annular actuation ring having a bushing extending through a thickness of the outer casing. A variable stator vane is disposed between the inner and outer casing. The variable stator vane assembly includes an airfoil having a first end disposed proximate the outer casing, a second end disposed proximate the inner casing, and a longitudinal axis connecting the first end with the second end. The variable stator vane further includes a first trunnion disposed through the bushing along the longitudinal axis at the airfoil first end. The first trunnion includes a trunnion seat extending integrally from the outer casing opposite the airfoil. The trunnion seat includes first and second parallel seating flats opposing each other about the longitudinal axis. A threaded stem extends integrally from the trunnion seat and is coaxial with the trunnion about the longitudinal axis. The threaded stem includes a flat first alignment surface coextensive with the first parallel seating flat in the longitudinal direction, and an arcuate second alignment surface aligning with the second parallel seating flat in the longitudinal direction. The variable stator vane assembly further includes a lever arm having a mounting hole at a proximal end thereof and an actuation pin at a distal end thereof, and a retention nut configured to secure the lever arm about the trunnion seat when engaged with the threaded stem. The mounting hole is configured for complementary engagement with the trunnion seat. The actuation pin is configured for complementary engagement with the annular actuation ring.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
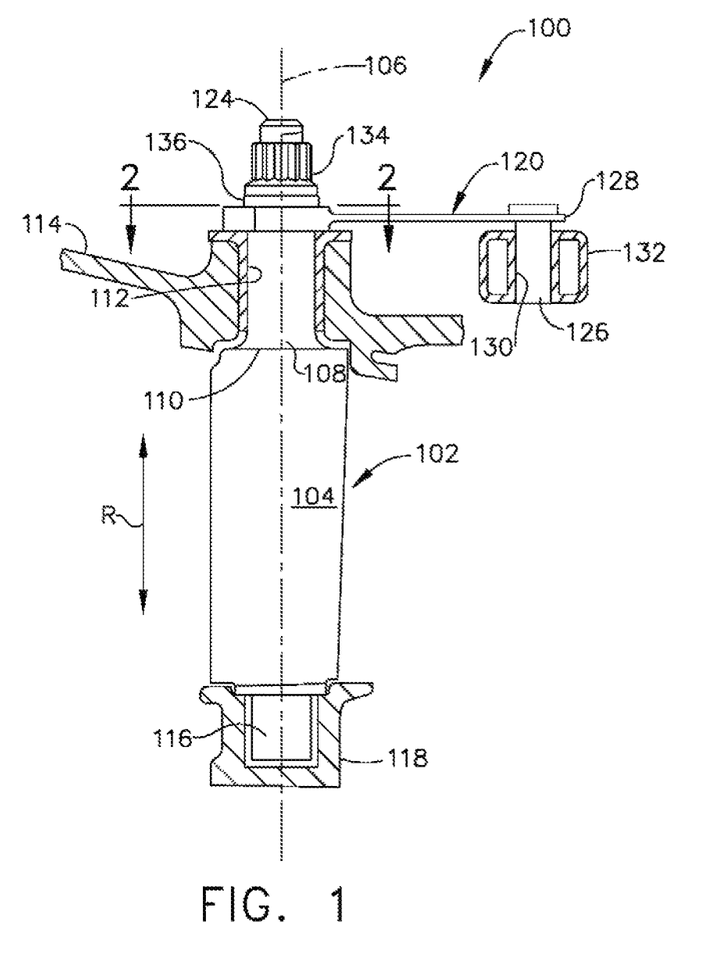
FIG. 1 is a partial sectional view of a variable stator vane for mounting in a multistage axial compressor of a gas turbine engine in accordance with an exemplary embodiment of the present disclosure.

FIG. 1 is a partial sectional view of a multistage axial compressor 100 of a gas turbine engine (not shown) in accordance with an exemplary embodiment of the present disclosure. In the exemplary embodiment, compressor 100 includes a plurality of circumferentially spaced apart variable stator vanes 102. Each variable stator vane 102 includes an airfoil 104 extending in a radial direction R along a central longitudinal axis 106, and a radially outer trunnion 108 extending coaxially and integrally outwardly from a distal end 110 of airfoil 104 for pivotally mounting airfoil 104 in a corresponding bushing 112 extending through a thickness of an outer casing 114 of compressor 100. In an alternative embodiment, variable stator vane further includes a radially inner trunnion 116 mounted in a sealing ring 118 within an inner casing (not shown) of compressor 100, such that variable stator vane 102 is also pivotally mounted at the inner casing at the inner trunnion 116, and coupled to the outer stator casting via the outer trunnion 108.

Compressor 100 further includes a lever arm 120 which includes a mounting hole (shown in FIG. 2, not shown in FIG. 1) at a proximal end thereof which is positionable over a threaded stem 124 extending from airfoil distal end 110. An actuation pin 126 is disposed at a distal end 128 of lever arm 120 and is received in a complementary hole 130 in an annular actuation ring 132 coupled with outer casing 114. In an exemplary embodiment, variable stator vane 102 and lever arm 120 are rotatably coupled with outer casing 114 by threaded engagement of a retention nut 134 about threaded stem 124. In an alternative embodiment, a washer 136 is disposed around threaded stem 124 between lever arm 120 and retention nut 134.

Figure 2:
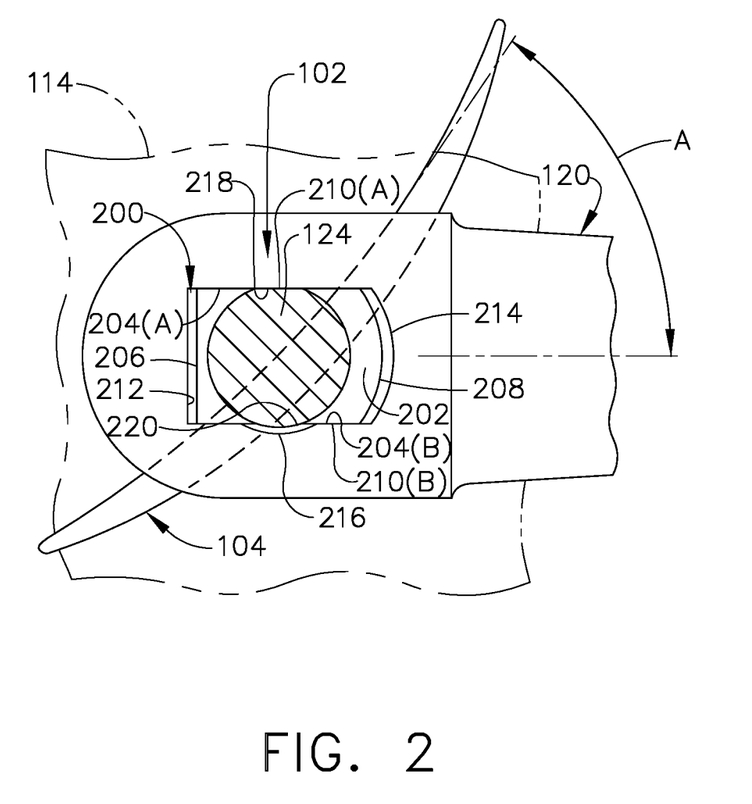
FIG. 2 is an elevated partial sectional view of the variable stator vane illustrated in FIG. 1 through a mounting hole, and taken along line 2-2.

FIG. 2 is an elevated partial sectional view of variable stator vane 102 through a mounting hole 200 of lever arm 120 taken along line 2-2, shown in FIG. 1. The use of same reference symbols in different drawings indicates similar or identical exemplary elements for purposes of illustration.

Variable stator vane 102 includes a quadrilateral or generally D-shaped trunnion seat 202 extending integrally outwardly from an outer distal end (shown in FIGS. 3-4) of outer trunnion 108 and coaxially therewith. Trunnion seat 202 includes a pair of opposite, parallel seating flats 204(A) and 204(B), a flat seating wall 206 extending between parallel seating flats 204(A) and 204(B) at one end (not numbered) thereof, and an arcuate wall 208 extending between parallel seating flats 204(A) and 204(B) at an opposite end (also not numbered) thereof, which collectively define the generally D-shaped mounting block shape of trunnion seat 202.

Mounting hole 200 is complementary with the trunnion seat 202 and is also quadrilateral and generally D-shaped. Mounting hole 200 includes a pair of opposite and parallel flat hole sides 210(A) and 210(B), a generally perpendicular side 212 extending between parallel flat hole sides 210(A) and 210(B) at one end (not numbered), and an arcuate side 214 extending between parallel flat hole sides 210(A) and 210(B) at an opposite end (also not numbered) thereof. Flat hole side 210(A) is flat across its entire length, and flat hole side 210(B) includes a partial concave scalloped portion 216 generally disposed centrally within the length of flat hole side 210(B).

To promote self-alignment between lever arm 120 and airfoil 104 during the assembly thereof, threaded stem 124 includes an elongate first alignment surface 218 that is substantially flat along flat hole side 210(A) and coextensive with seating flat 204(A). To inhibit lever arm 120 from being positioned backwards or upside down around threaded stem 124, threaded stem 124 further includes an asymmetric second alignment surface 220 that is arcuate along flat hole side 210(B) and generally aligned with seating flat 204(B). In the exemplary embodiment, viewed in the radial direction R, arcuate second alignment portion slightly overhangs seating flat 204(B).

According to the exemplary embodiment, parallel flat hole sides 210(A) and 210(B) of mounting hole 200 define complementary surfaces that cooperate with parallel seating flats 204(A) and 204(B), respectively, to restrain rotation of lever arm 120 about threaded stem 124 upon proper installation together. Additionally, the complementary cooperation of scalloped portion 216 of mounting hole 200 with arcuate second alignment surface 220 prevents lever arm 200 from being misoriented around threaded stem 124 before threaded stem 124 is inserted into mounting hole 200. In the exemplary embodiment, parallel flat hole sides 210(A) and 210(B), including scalloped portion 216, are integral or one-piece portions of lever arm 120 and extend completely therethrough across a thickness of lever arm 120.

Figure 3:
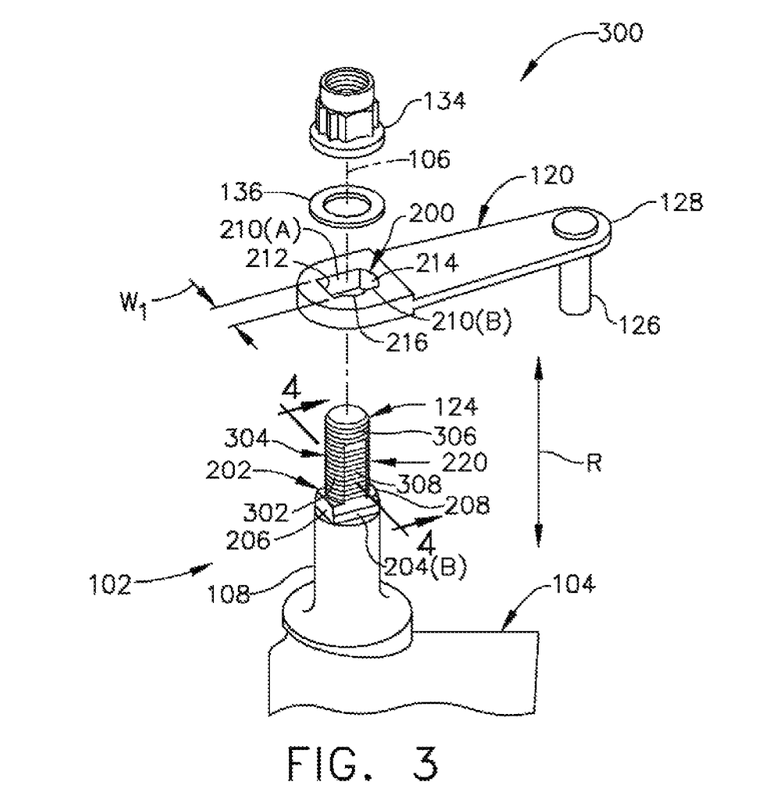
FIG. 3 is an exploded view of an assembly of the variable stator vane with the lever arm illustrated in FIG. 1.

FIG. 3 is an exploded view of an exemplary assembly 300 of variable stator vane 102 with lever arm 120. In the exemplary embodiment, mounting hole 200 is sized to have a width ($W_1$) slightly less than a width ($W_2$, shown in FIG. 4) of trunnion seat 202 for effecting an interference fit therewith when assembled thereto, as described further below with respect to FIG. 4. Threaded stem 124 includes a plurality of screw threads 302 spiraling around its circumferential perimeter 304. Threaded stem 124 extends integrally and outwardly from trunnion seat 202, which itself extends integrally and outwardly from trunnion 108. Retention nut 134 and optional washer 136 are installed in turn over the distal end (not numbered) of threaded stem 124, with retention nut 134 being suitably tightened, e.g., by a wrench, for compressing mounting hole 200 of lever arm 120 in an interference fit over trunnion seat 202. In the exemplary embodiment, trunnion 108, trunnion seat 202, threaded stem 124, mounting hole 200, optional washer 136, and retention nut 134 are coaxial with central longitudinal axis 106.

Screw threads 302 are arcuate around portions of circumferential perimeter that generally align radially with flat seating wall 206 and arcuate wall 208, respectively, of trunnion seat 202, to maximize thread gripping surfaces with complementary retention nut 134 when secured together. In an exemplary embodiment, screw threads 302 of second alignment portion 220 of threaded stem 124 are also arcuate between trunnion seat 202 and the distal end of threaded stem 124. In an alternative embodiment, second alignment surface 202 includes a first arcuate threaded portion 306 proximate the distal end of threaded stem 124, and a second flat threaded portion 308 proximate trunnion seat 202. Second flat threaded portion 308 extends opposite and generally parallel with first flat alignment surface 218 (shown in FIG. 4).

In the alternative embodiment, first arcuate threaded portion 306 spans at least three consecutive screw threads 302 in the radial direction R. In a further alternative embodiment, first arcuate threaded portion 306 spans a radial distance from the distal end of threaded stem 124, i.e., a sufficient number of screw threads 302, that is greater than the thickness of lever arm 120. A sufficient radial span to first arcuate threaded portion further inhibits a misaligned mounting hole 200 from being forced over threaded stem 124 by accident.

Figure 4:
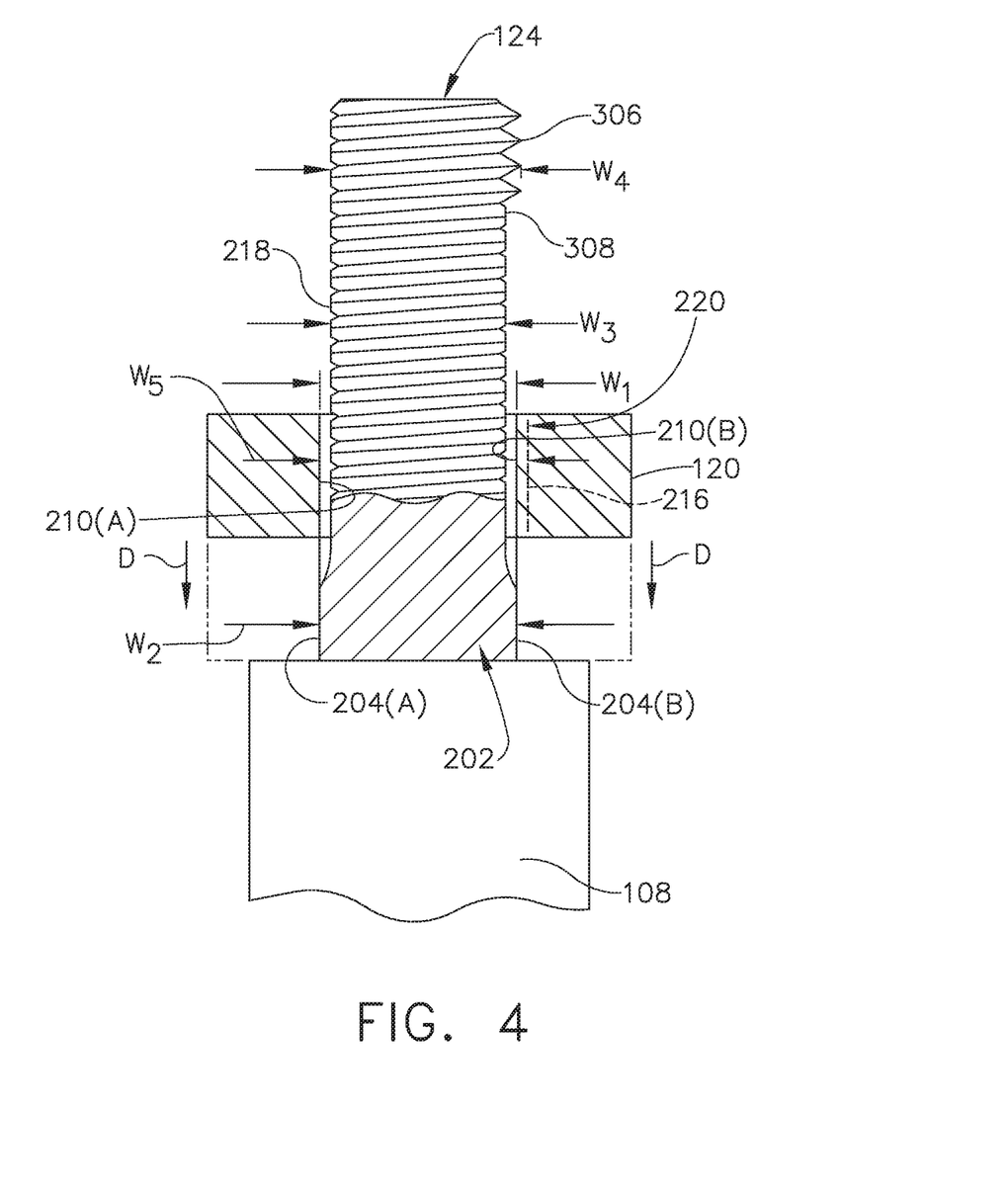
FIG. 4 is a transverse partial sectional view of the trunnion illustrated in FIG. 3 with the lever arm installed over the trunnion seat, and taken along line 4-4.

FIG. 4 is a transverse partial sectional view of outer trunnion 108, as illustrated in FIG. 3, with lever arm 120 being installed over trunnion seat 202, and taken along line 4-4. According to this exemplary embodiment, mounting hole 200 is sized to have first width $W_1$, which is the distance between parallel flat hole sides 210(A) and 210(B), be slightly less than a second width $W_2$ of trunnion seat 202 between parallel seating flats 204(A) and 204(B) for effecting an interference fit therewith when lever arm 120 is installed downwardly over threaded stem 124.

In the exemplary embodiment, mounting hole 200 is predeterminedly sized for being installed downwardly in the direction D over threaded stem 124 while flat first alignment surface 218 of threaded stem 124 restrains rotation of lever arm 120 about threaded stem 124 until mounting hole 200 engages trunnion seat 202 for ensuring a predetermined rotational orientation, or reference angle A, as illustrated in FIG. 2, between lever arm 120 and airfoil 104. Referring back to FIG. 4, first width $W_1$ is similarly slightly greater than a third width $W_3$, which is the distance between first flat alignment surface 218 and second flat threaded portion 308, to allow easy movement of lever arm 120 about threaded stem 124 in the downward direction D, until lever arm 120 fully engages trunnion seat 202.

In the exemplary embodiment, threaded stem 124 is also sized to have fourth width $W_4$, which is the distance between first flat alignment surface 218 and outermost circumferential perimeter 304 of first arcuate threaded portion 306, that is significantly greater than first width $W_1$ of mounting hole 200, such that threaded stem 124 cannot enter and pass through mounting hole 200 unless first arcuate threaded portion 306 is correctly aligned with scalloped portion 216 of flat hole side 210(B). A fifth width $W_5$ is the distance between flat hole side 210(A) and an innermost concave depth (not numbered) of concave scalloped portion 216. Fifth width $W_5$ is at least slightly greater than fourth width $W_4$, to allow easy entry of threaded stem 124 through mounting hole 200 when both are oriented correctly with respect to one another. According to the exemplary embodiment: $W_5 > W_4 > W_2 > W_1 > W_3$.

Exemplary embodiments of assembly systems for variable stator vanes in a compressor for a gas turbine engine are described above in detail. The attachment systems, and methods of operating such systems and component devices are not limited to the specific embodiments described herein, but rather, components of the systems and/or steps of the methods may be utilized independently and separately from other components and/or steps described herein. For example, the systems and methods may also be used in combination with other systems where variable stator vanes couple inner and outer casings together, and are not limited to practice with only the systems and methods as described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A variable stator vane comprising:
   an airfoil comprising a first end, a second end, and a longitudinal axis extending between said first end and said second end;
   a first trunnion disposed along said longitudinal axis at said first end, said first trunnion comprising a trunnion seat extending from a distal end of said first trunnion opposite said airfoil, said trunnion seat comprising first and second parallel seating flats opposing each other about said longitudinal axis;
   a threaded stem extending from said trunnion seat and coaxial with said first trunnion about said longitudinal axis, said threaded stem comprising a flat first alignment surface coextensive with said first parallel seating flat in the longitudinal direction, and an arcuate second alignment surface aligning with said second parallel seating flat in the longitudinal direction; and
   a lever arm comprising a mounting hole at a proximal end thereof, said mounting hole configured for complementary engagement with said trunnion seat, wherein the mounting hole defines a D-shape slot comprising a concave scallop portion positioned corresponding to the flat portion at the threaded stem, and wherein said concave scallop portion is configured to conform to an external dimension of said arcuate portion of said threaded stem, and wherein the D-shape slot comprises an arcuate side corresponding to the arcuate portion of the threaded stem, wherein the threaded stem comprises a flat portion coextensive with said second parallel seating flat and an arcuate portion disposed at a distal end of said threaded stem opposite said trunnion seat, and wherein the arcuate portion at the distal end of the threaded stem is radially outward to the flat portion radially inward of the arcuate portion.

2. The variable stator vane as claimed in claim 1, further comprising a second trunnion disposed along said longitudinal axis at said second end.

3. The variable stator vane as claimed in claim 2, wherein said first trunnion is configured to couple to an inner stator casing of a compressor and said second trunnion is configured to couple with an outer stator casing of the compressor.

4. The variable stator vane as claimed in claim 3, wherein said first and second trunnions are configured to pivotally mount said airfoil to the stator casing.

5. The variable stator vane as claimed in claim 1, wherein screw threads on said threaded stem are continuous at said arcuate portion and are interrupted at said flat portion and extend only partially therein.

6. The variable stator vane as claimed in claim 5, wherein said arcuate portion comprises a longitudinal span of at least three contiguous threads of said threaded stem.

7. The variable stator vane as claimed in claim 1, said trunnion seat further comprising a D-shape mounting block, said D-shape mounting block comprising a flat wall and an arcuate wall opposing each other about said longitudinal axis and connecting said first parallel seating flat with said second parallel seating flat.

8. The variable stator vane as claimed in claim 1, wherein said first trunnion has an outer diameter across said longitudinal axis, said threaded stem has an outer diameter across said longitudinal axis, and said first trunnion outer diameter is greater than said threaded stem outer diameter.

9. The variable stator vane of claim 1, wherein the threaded stem defines a width between the flat first alignment surface and an outermost circumferential perimeter of the arcuate portion, and wherein the width thereof is greater than a width between the flat first alignment surface and the flat portion.

10. A variable stator vane assembly comprising:
an airfoil comprising a first end, a second end, and a longitudinal axis extending between said first end and said second end;
a first trunnion disposed along said longitudinal axis at said airfoil first end, said first trunnion comprising a trunnion seat extending integrally from a distal end of said trunnion opposite said airfoil, said trunnion seat comprising first and second parallel seating flats opposing each other about said longitudinal axis;
a threaded stem extending integrally from said trunnion seat and coaxial with said trunnion about said longitudinal axis, said threaded stem comprising a flat first alignment surface coextensive with said first parallel seating flat in the longitudinal direction, and an arcuate second alignment surface aligning with said second parallel seating flat in the longitudinal direction, wherein the threaded stem comprises a flat portion coextensive with said second parallel seating flat and an arcuate portion disposed at a distal end of said threaded stem opposite said trunnion seat, and wherein the arcuate portion at the distal end of the threaded stem is radially outward to the flat portion radially inward of the arcuate portion;
a lever arm comprising a mounting hole at a proximal end thereof, said mounting hole configured for complementary engagement with said trunnion seat, wherein the mounting hole defines a D-shape slot comprising a concave scallop portion positioned corresponding to the flat portion at the threaded stem, and wherein said concave scallop portion is configured to conform to an external dimension of said arcuate portion of said threaded stem, and wherein the D-shape slot comprises an arcuate side corresponding to the arcuate portion of the threaded stem; and
a retention nut configured to secure said lever arm about said trunnion seat when engaged with said threaded stem.

11. The variable stator vane as claimed in claim 10, wherein screw threads on said threaded stem are continuous at said arcuate portion and are interrupted at said flat portion and extend only partially therein.

12. The variable stator vane assembly as claimed in claim 11, said trunnion seat further comprising a D-shape mounting block, said D-shape mounting block comprising a flat side and an arcuate wall opposing each other about said longitudinal axis and connecting said first parallel seating flat with said second parallel seating flat.

13. The variable stator vane assembly as claimed in claim 12, wherein the D-shape slot comprises first and second opposing parallel flat sides, and a third flat side opposing an arcuate side, said third flat side and said opposing arcuate side connecting said first parallel flat side with said second parallel flat side.

14. The variable stator vane assembly as claimed in claim 13, wherein said second opposing parallel flat side is configured to permit passage through said mounting hole of said flat first alignment surface of said threaded stem, and inhibit passage through said mounting hole of said arcuate second alignment surface of said threaded stem.

15. The variable stator vane assembly as claimed in claim 14, wherein said first opposing parallel flat side is configured to permit passage through said mounting hole of said arcuate second alignment surface of said threaded stem.

16. The variable stator vane assembly of claim 13, wherein the concave scallop portion is defined at one or more of the first and second opposing parallel flat sides.

17. The variable stator vane assembly according to claim 10, further comprising a washer disposed about said threaded stem between said lever arm and said retention nut.

18. A compressor for a gas turbine engine comprising:
an inner casing;
an outer casing surrounding said inner casing, said outer casing comprising an annular actuation ring at least one bushing extending through a thickness of said outer casing; and
a variable stator vane disposed between said inner and outer casing, said variable stator vane assembly comprising:
an airfoil comprising a first end disposed proximate said outer casing, a second end disposed proximate said inner casing, and a longitudinal axis connecting said first end with said second end;
a first trunnion disposed through said at least one bushing along said longitudinal axis at said airfoil first end, said first trunnion comprising a trunnion seat extending integrally from said outer casing opposite said airfoil, said trunnion seat comprising first and second parallel seating flats opposing each other about said longitudinal axis;

a threaded stem extending integrally from said trunnion seat and coaxial with said trunnion about said longitudinal axis, said threaded stem comprising a flat first alignment surface coextensive with said first parallel seating flat in the longitudinal direction, and an arcuate second alignment surface aligning with said second parallel seating flat in the longitudinal direction, and wherein the arcuate second alignment surface is disposed at a distal end of said threaded stem is opposite said trunnion seat, and wherein the arcuate second alignment surface at the distal end of the threaded stem is radially outward to the flat first alignment surface radially inward thereof;

a lever arm comprising a mounting hole at a proximal end thereof and an actuation pin at a distal end thereof, said mounting hole configured for complementary engagement with said trunnion seat and said actuation pin configured for complementary engagement with said annular actuation ring, wherein the mounting hole defines a D-shape slot comprising a concave scallop portion positioned corresponding to the flat portion at the threaded stem, and wherein said concave scallop is configured to conform to an external dimension of said arcuate portion of said threaded stem, and wherein the D-shape slot comprises an arcuate side corresponding to the arcuate portion of the threaded stem; and a retention nut configured to secure said lever arm about said trunnion seat when engaged with said threaded stem.

19. The compressor as claimed in claim 18, wherein said mounting hole of said lever arm is configured to permit passage of said threaded stem therethrough in a single orientation, and inhibit passage of said threaded stem in substantially any other orientation.

20. The compressor as claimed in claim 18, wherein said variable stator vane further comprises a second trunnion disposed along said longitudinal axis at said second end, and wherein said inner casing further comprises a sealing ring configured to mount said second trunnion therein.

* * * * *